United States Patent Office 3,450,884
Patented June 17, 1969

3,450,884
MEASURING INSTRUMENT FOR USE WITH A THERMOLUMINESCENT DOSIMETER
Raymond Schayes, Brussels, and Roger Gourlet, Foret, Belgium, assignors to Manufacture Belge de Lampes et de Materiel Electronique en abrege MBLE, Brussels, Belgium
Filed Oct. 3, 1966, Ser. No. 583,694
Claims priority, application Belgium, Oct. 1, 1965, 18,597
Int. Cl. H01j 3/12
U.S. Cl. 250—206   9 Claims

ABSTRACT OF THE DISCLOSURE

A radiation detection system for a thermoluminescent dosimeter includes a photodiode, a resistor and a capacitor in series across a voltage source. A DC amplifier has its input terminals connected across the series combination of the resistor and capacitor. A diode is connected between the amplifier output and one electrode of the capacitor and is poled so as to charge the capacitor to a voltage that is equal and opposite to the maximum voltage developed across the resistor.

---

Figure 1:
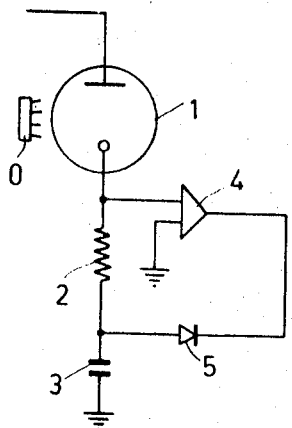

This invention relates to thermoluminescent dosimeters and more particularly to a device for measuring the radiation to which the dosimeter has been exposed.

Thermoluminescent dosimeters comprise a so-called thermoluminescent substance which absorbs radiation energy under the action of an ionizing radiation and which emits, upon heating, the absorbed radiation energy in the form of light. The quantity of radiation can be measured by converting the quantity of light into an electric voltage by means of a photocell.

The quantity of light is usually measured by means of a photomultiplier, to which an amplifier is added so that an adequate quantity of energy is supplied for a direct reading of the voltage to be measured from a measuring instrument. However, photomultipliers are comparatively large and require a high supply voltage of about 1000 to 2000 v. Furthermore, their multiplication factor is not stable.

It is in general sufficient to measure the peak value of the voltage which corresponds to the variation of the light emitted by the thermoluminescent substance. The intensity of said light has a peak value depending only upon the intensity of the radiation when the temperature increases uniformly. In this case a simpler and more compact measuring instrument can be used than in the case of a direct reading of the voltage to be measured.

A peak voltage measuring instrument is known to comprise a capacitor which is charged by a current depending upon the voltage to be measured. In the present case, however, such an arrangement cannot be used directly without further modification, since the available current depends upon the light radiation of the thermoluminescent substance, which is particularly small in the absence of additional amplification. The capacitor can be charged by a fairly low current so that a photo-sensitive tube with internal electron multiplication is not required. Instead a photo-sensitive tube may be employed in which electrons are passed, dependent upon the incident light, between two electrodes, which tube does not exhibit the disadvantages of the first-mentioned tube and is capable of operating at a low voltage. In conjunction with a simple amplifier, an adequate current is readily obtained for charging a capacitor up to a voltage which increases with the varying light radiation of the thermoluminescent substance.

An object of the invention is to provide a device which provides said advantages. According to the invention, one side of the photo-diode is connected through a resistor to a capacitor, while the input terminals of a D.C. amplifier having a very high input resistance are connected to the two ends of the series combination of the resistor and the capacitor. One side of said capacitor is connected through a current source to the other side of the photo-diode. A diode connects the output of the amplifier to the other side of the capacitor, the pass direction of the diode being chosen so that the charging voltage of the capacitor is opposite the voltage across the resistor. The correct pass direction of the diode provides a voltage across the capacitor which corresponds with the maximum voltage across the resistor, which is a measure of the maximum intensity of the light emitted by the thermoluminescent substance.

According to a further aspect of the invention, the voltage produced across the capacitor is measured by means of a second capacitor and a two-position commutator. In one position, the commutator connects the two capacitors in parallel and, in the other position, establishes a connection to the input of the amplifier whereby the two capacitors are connected with opposite voltage polarities in series to the input of the amplifier. The commutator actuates a second switch which establishes, when the commutator occupies the last-mentioned position, a connection between a measuring instrument and one of the capacitors and the output of the amplifier.

Figure 2:
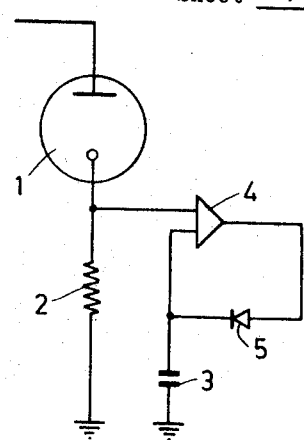
Figure 3:
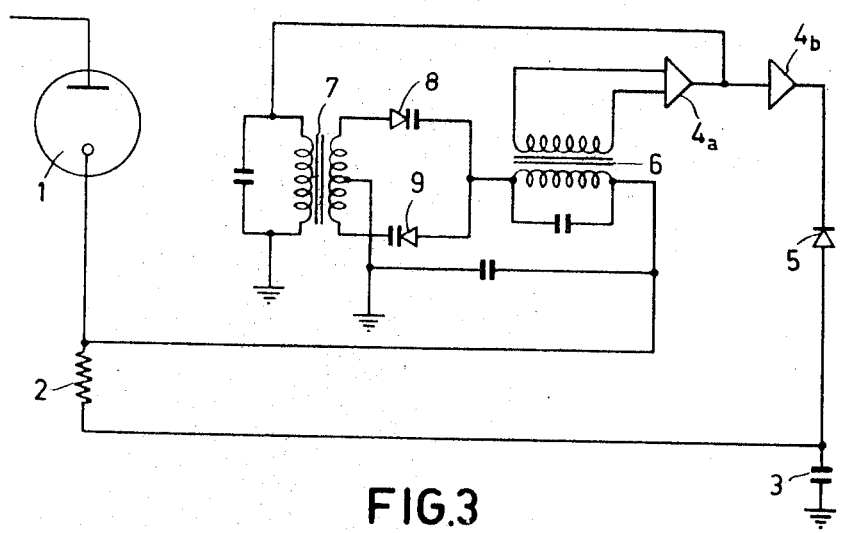
Figure 4:
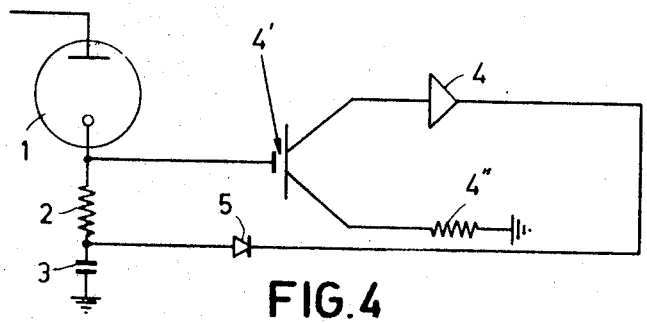
Figure 5:
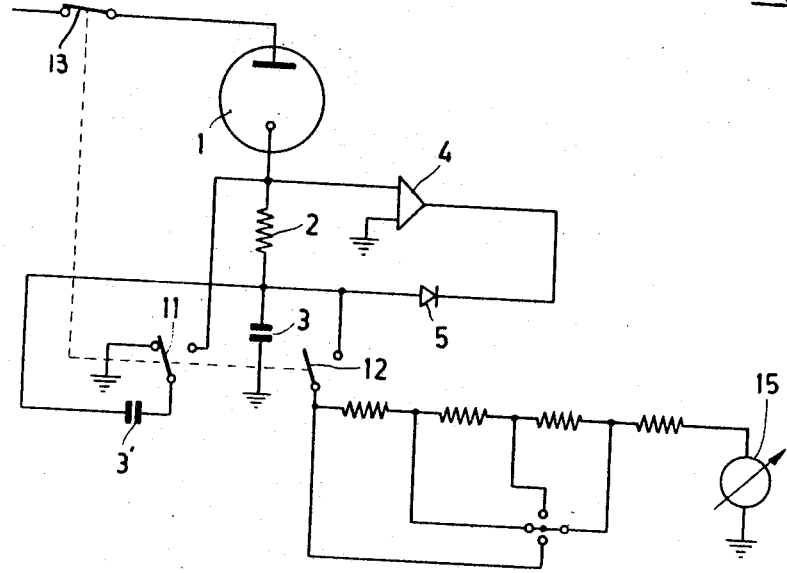
Figure 6:
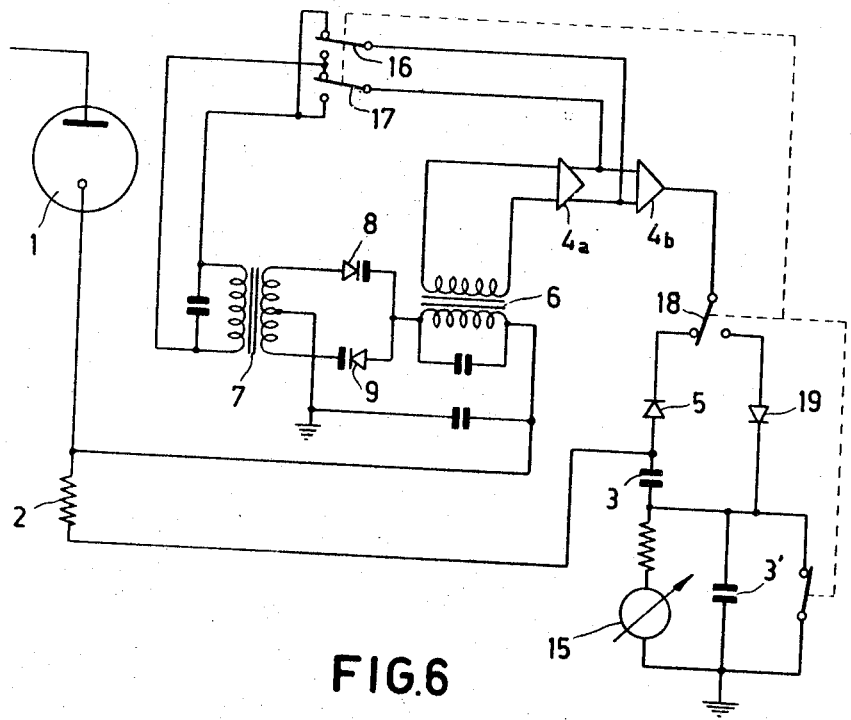
Figure 7:
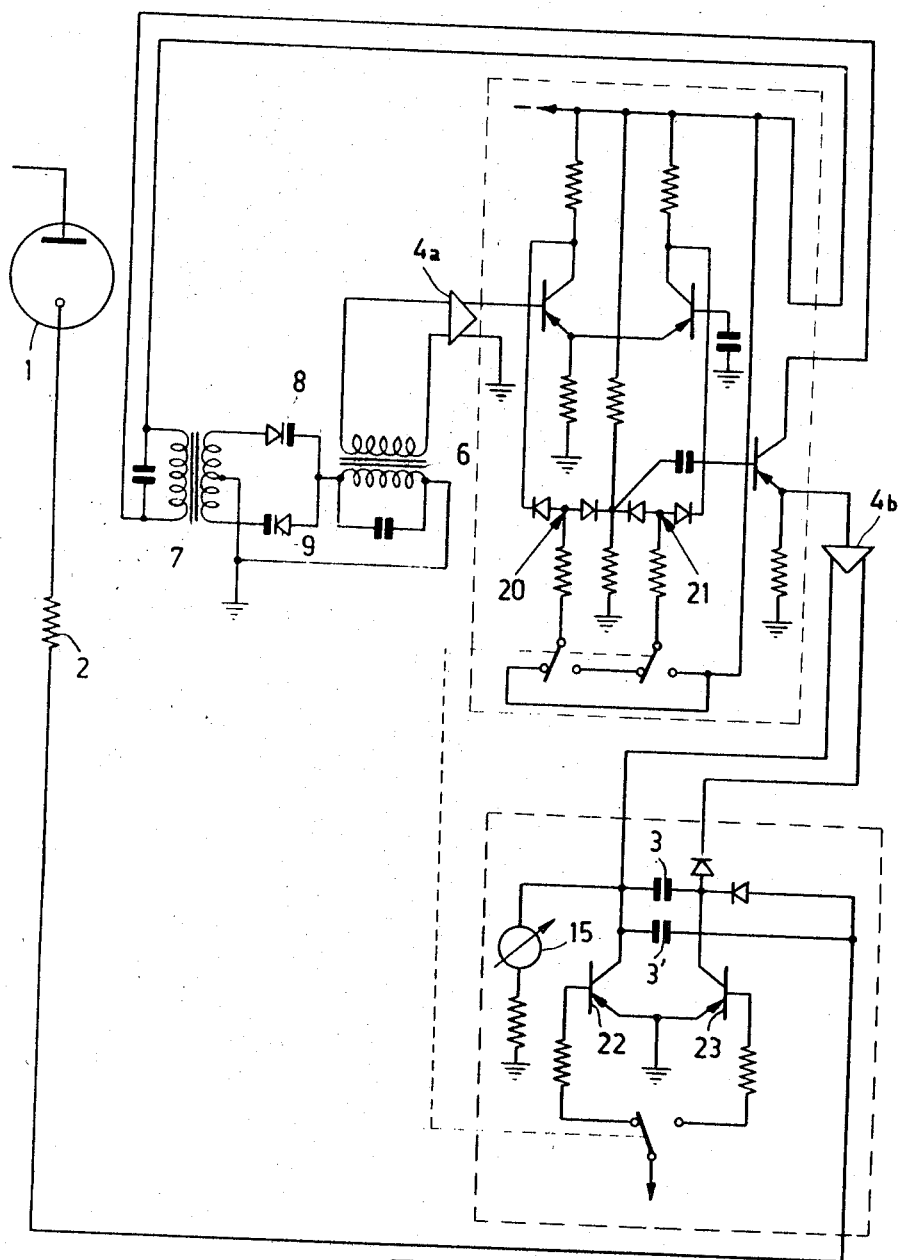

The invention will now be described in detail with reference to the drawing, in which:

FIGS. 1 and 2 show the basic diagram of a device according to the invention,

FIG. 3 shows an embodiment of the device of FIG. 1, in which the amplifier is a parametric low-frequency amplifier, FIG. 4 shows an embodiment of the device of FIG. 1, in which the input of the amplifier includes a field-effect transistor, FIG. 5 shows an embodiment of the device of FIG. 1, with a circuit arrangement for measuring the capacitor voltage, FIG. 6 shows an arrangement for measuring the capacitor voltage in a different manner and FIG. 7 shows an embodiment, in which the commutation is performed by electronic agency.

The basic diagram of the device according to the invention comprises a photo-diode 1, a resistor 2 and a capacitor 3, the latter two being connected in series to the input terminals of a D.C. amplifier 4. The junction of the resistor and the capacitor is connected by a diode 5 to the output of the amplifier. The dosimeter is designated by the reference numeral 0. The amplifier 4 serves to charge the capacitor 3 to a voltage which closely approaches the peak value of the voltage drop across the resistor 2. The capacitor is charged up to said peak value by means of the diode 5.

If the voltages across the resistor 2 and the capacitor 3 are equal, no signal appears at the input of the amplifier 4. The diode 5 remains cut off by the voltage across the capacitor 3. However, if this voltage diminishes slightly or if the voltage across the resistor 2 rises to some extent, a signal appears at the input of the amplifier 4. The amplifier passes an output signal through the diode 5 so that the capacitor 3 is additionally charged until the voltage is again approximately equal to the voltage across the resistor 2. It is thus possible to maintain a voltage across the capacitor 3 which is substantially equal to the peak value of the voltage across the resistor 2.

As is shown in FIG. 2, the difference between the voltage drop across the resistor 2 and the charging voltage of the capacitor 3 is transmitted to the input of the amplifier 4, the output signal of which additionally charges the capacitor if the voltage thereof is lower than the voltage of the resistor. The difference only consists in that a conductor connected to the supply source, the other terminal of which is connected to the photo-diode 1, is not connected to the side of the capacitor 3, where the amplifier 4 is connected, but is connected to the other side, so that it is necessary to connect the diode 5 to the opposite side of the capacitor 3 and to invert the pass direction of the diode 5.

The arrangement shown in FIG. 3 is based on the embodiment of FIG. 1. The D.C. amplifier of high input resistance is, however, a self-oscillating parametric amplifier. For this purpose diodes are employed having p-n junction which comprise a voltage-dependent capacitance. These diodes will hereinafter be termed "varicaps."

The arrangement of the parts is the same as in FIG. 1. The photo-diode 1, the resistor 2, the capacitor 3, the amplifier 4 and the diode 5 have the same functions. The amplifier 4, however, is a self-oscillating parametric amplifier having a first amplifying stage 4a in the feedback circuit and a second stage 4b, which amplifies the oscillation. The varicaps 8 and 9 are included in two parallel branches fed by equal, but opposite alternating voltages. This is achieved by means of the secondary winding of a transformer 7, the central tapping of which is connected to ground. The input signal of this parametric amplifier is obtained from a conductor which connects the photo-diode 1 to the resistor 2. If no direct voltage appears at said input, the varicaps 8 and 9 do not exhibit a direct voltage, and the capacitances thereof are the same. The primary winding of the transformer 7 does not receive alternating voltage when an alternating voltage is fed back to the primary winding of the transformer 7. The amplifier is then not capable of oscillating. However, if a direct voltage appears at the input, the value of the capacitances of the varicaps 8 and 9 varies in the opposite sense, so that an alternating voltage $V_7$ across the primary winding of the transformer 7 is capable of producing an alternating voltage $V_6$ across the secondary winding of the transformer 6. If in the feedback circuit the overall amplification becomes equal to 1, that is to say when $V_6 V_7 = 1/A$, wherein A designates the amplification factor of the amplifier 4a, the circuit starts oscillating. The advantages of the parametric amplifier lie in its very high input resistance and the great stability in time, as well as the high sensitivity and the lower noise level. As soon as the voltage across the resistor 2 exceeds the voltage across the capacitor 3, the device starts oscillating. The oscillations are amplified by the amplifier 4b and the negative half periods of the alternating voltage additionally charge the capacitor 3 through the diode 5. However, if the voltage across the resistor 2 is lower than the voltage across the capacitor 3, the feedback alternating voltage $V_6$ will be in phase opposition to the required alternating voltage to be fed back for maintaining the oscillation, so that the oscillation is interrupted. This is necessary to prevent the negative half periods from additionally charging the capacitor 3, which is in this case undesirable. The oscillation voltage can therefore be applied directly to the diode 5 without the need for rectification. The amplifier 4b is only required for supplying an adequate quantity of energy for additionally charging the capacitor.

As is shown in FIG. 4, a field effect transistor with metal oxide insulation (MOS—FET) may be connected to the input of the amplifier 4. The transistor is designated by 4′ and a polarising resistor is designated by 4″.

A complete observation of the dose of radiation, after the dosimeter is heated, implies that the voltage across the capacitor 3 must be measured with great accuracy and the charge on said capacitor must not be influenced by the measuring operation. In order to obtain a measuring instrument which is small, nonfragile and cheap and permits the use of a simple moving coil voltmeter without incurring the risk of a discharge of the capacitor, the capacitor is additionally charged, in accordance with the invention, by comparing the charge with the voltage across an auxiliary capacitor, which also is charged up to the voltage to be measured, instead of comparing said charge with the voltage drop across the resistor. For this purpose the same amplifier may be used.

In FIG. 5, the second capacitor is designated by 3′ and the voltmeter circuit by 15. There are furthermore provided three contacts 11, 12 and 13, which are changed over in common when passing over from the charging state to the measuring state or conversely. The figure shows the three contacts in a position in which the capacitors 3 and 3′ are charged by the current flowing from the photo-diode 1 through the resistor 2. The maximum voltage is produced across the two series-connected capacitors. In the measuring state contact 11 is changed over, contact 12 is closed and contact 13 is opened. The auxiliary capacitor 3′, in series with the capacitor 3, is connected to the input of the amplifier 4. The voltages across the two capacitors have opposite polarities. Since the value of the resistor 2 and the input resistance of the amplifier 4 are very high, the charge of the auxiliary capacitor 3′ will substantially not be varied. When contact 13 is opened, the supply source is separated from the photo-diode and when contact 12 is closed, the voltmeter circuit 15 is connected to capacitor 3.

It will be obvious that the same principle may also be applied to the arrangement shown in FIG. 2 and that the voltmeter can be connected to the auxiliary capacitor. In this case also the diode 5 has to be connected to the output of the amplifier 4 so that the auxiliary capacitor is additionally charged.

FIG. 6 shows a variant in which first the two capacitors are charged and subsequently the auxiliary capacitor is additionally charged, to which the voltmeter is connected. During the charging period the auxiliary capacitor 3′ is short-circuited, as well as the voltmeter connected in parallel therewith. At the change-over to the measuring state, the short-circuit is removed so that the two capacitors 3 and 3′ are in series with the input of the amplifier and the auxiliary capacitor 3′ is charged additionally up to the voltage prevailing across the capacitor 3. This is achieved via a second diode 19, to which the output of the amplifier 4b is connected. With this arrangement the use of the high-insulated contact 11 at the input of the amplifier 4 (FIG. 5) may be dispensed with.

The amplifier of FIG. 6 is also a self-oscillating amplifier of the kind described with reference to FIG. 3. At the change-over to the measuring state it has to be considered that oscillation has to be performed with an input signal of opposite polarity as compared with the preceding state. Therefore, the switch 16, 17 has to invert the polarity of the feedback.

The commutations may be performed by means of electronic switches. FIG. 7 shows an embodiment thereof. The mechanical contacts are replaced by diodes and transistors. The amplifier is again a self-oscillating amplifier as in FIG. 3. The polarity of the feedback is inverted by means of the diode gates 20 and 21. By means of the transistors 22 and 23 the main capacitor and the auxiliary capacitor are changed over. In one state transistor 22 is conducting and the transistor 23 is cut off. Then the voltmeter 15 is short-circuited and the two capacitors 3 and 3′ are charged in parallel by the output signal of the amplifier. In the measuring state the transistor 23 is conducting, whereas the transistor 22 is cut off. Then the two capacitors are connected in series with opposite voltages to the input of the amplifier through the resistor 2 and the mass. The voltmeter 15 is then connected across the capacitor 3, which is additionally charged by the output signal of the amplifier.

It will be obvious that these principles and change-over methods may also be applied when an amplifier as shown in FIG. 4 is employed.

What is claimed is:

1. A measuring device for a radiation-sensitive thermoluminescent dosimeter comprising, a photo-diode for converting the incident light emitted by the thermo-luminescent substance of said dosimeter upon an increase in temperature into an electric current, a resistor, a capacitor, means connecting one side of the photo-diode through said resistor to the capacitor, a D.C. amplifier having a very high input resistance, means connecting the input terminals of said amplifier to the two ends of the series combination of the resistor and the capacitor, means connecting one side of said capacitor via a current supply source to the other side of the photo-diode, a diode, means connecting said diode between the output of the amplifier and the other side of the capacitor with its polarity chosen so that the charging voltage of the capacitor opposes the voltage developed across the resistor, said capacitor attaining a voltage equal to the maximum voltage appearing across said resistor.

2. A device as claimed in claim 1 further comprising an auxiliary capacitor, a commutator having two operative positions, means connecting the commutator to said capacitors so that the two capacitors are connected in parallel in one of said positions whereby the two capacitors are charged to the same maximum voltage, and in the other commutator position the two capacitors are connected in series with opposite voltages to the input terminals of the amplifier, a measuring instrument, a second switch coupled to said instrument and actuated by the commutator so that in the second position of the commutator the measuring instrument is connected to one of the capacitors and to the output of the amplifier.

3. A device as claimed in claim 1, wherein the diode is connected to the junction of the capacitor and the resistor, said device further comprising, a voltmeter, an auxiliary capacitor, means connecting the voltmeter and auxiliary capacitor in parallel with the junction of the other side of the capacitor and the supply source, a second diode connected on one side to the junction of the first capacitor and the auxiliary capacitor, the connection between the other side of the first capacitor and the supply source including switches which separate the output of the amplifier from the first diode and connect the latter to the other side of said second diode, said second diode being polarized so that the auxiliary capacitor can be charged only up to a voltage opposite the voltage across the first capacitor.

4. A device as claimed in claim 1, wherein the amplifier comprises a self-oscillating circuit having an alternating output voltage which is applied to said diode, said amplifier comprising mainly two parallel branches which are fed by equal but opposite alternating voltages, each of said branches including a diode having the same voltage-dependent capacitance curve connected with opposite polarities, means coupling the direct input voltage between the ends of said branches, feedback means coupling the alternating output voltage between said ends to the primary winding of a transformer, said transformer having two secondary windings which supply the alternating voltage for the parallel branches, so that the amplifier oscillates when the direct voltage at the input exceeds a given value.

5. A radiation detector system comprising, a source of supply voltage, a photodiode having one electrode connected to one terminal of said voltage source, a resistor, a capacitor, means connecting said resistor and capacitor in series to the other photodiode electrode, a DC amplifier having a high input impedance, means connecting the input terminals of said amplifier across the series combination of said resistor and capacitor, means connecting one electrode of the capacitor to the other terminal of the voltage source, a diode, means connecting said diode between the output of the amplifier and the other electrode of said capacitor, said diode being poled so that said voltage source charges the capacitor via said diode with a voltage that opposes the voltage developed across said resistor and to a maximum voltage substantially equal to the voltage across the resistor.

6. A detector system as claimed in claim 5 wherein one terminal of said resistor is directly connected to the other photodiode electrode and to one input terminal of said amplifier, said diode being connected between the output of the amplifier and the junction between said resistor and capacitor, and the other input terminal of the amplifier is directly connected to said one capacitor electrode that is connected to the other terminal of the voltage source.

7. A detector system as claimed in claim 5 wherein one terminal of said resistor is directly connected to the other photodiode electrode and to one input terminal of said amplifier, means directly connecting the other input terminal of the amplifier to the other electrode of said capacitor, the other terminal of said resistor and said one electrode of the capacitor being directly connected together to the other terminal of the voltage source.

8. A detector system as claimed in claim 5 further comprising, an electric meter, a second capacitor, switching means having first and second operative positions, and circuit means interconnecting said switching means with said capacitors and meter so that said capacitors are connected in parallel in the first position of said switching means whereby both capacitors are charged to the same voltage level, and said capacitors are connected in series opposition across the amplifier input terminals in the second position of said switching means with said meter connected to one of said capacitors.

9. A detector system as claimed in claim 5 further comprising, a feedback loop interconnecting the output and the input of said amplifier, said feedback loop comprising first and second parallel branches, each of said branches including a diode that exhibits a voltage-dependent capacitance, the diodes in said parallel branches being connected with opposite polarities.

References Cited

UNITED STATES PATENTS

| | | | |
|---|---|---|---|
| 3,343,043 | 9/1967 | Ito et al. | 250—206 X |
| 3,358,145 | 12/1967 | Cashion et al. | 250—71.5 X |
| 3,376,416 | 4/1968 | Turland et al. | 250—71 X |

JAMES W. LAWRENCE, *Primary Examiner.*

C. R. CAMPBELL, *Assistant Examiner.*

U.S. Cl. X.R.

250—83.3, 211; 324—111